(12) United States Patent
Kato

(10) Patent No.: US 11,862,858 B2
(45) Date of Patent: Jan. 2, 2024

(54) POLARIZATION DIRECTION MEASURING DEVICE, METHOD OF ACQUIRING INTENSITY RATIO TABLES, POLARIZATION DIRECTION MEASURING METHOD, AND COMPUTER-READABLE STORAGE MEDIUM

(71) Applicant: MITSUBISHI HEAVY INDUSTRIES, LTD., Tokyo (JP)

(72) Inventor: Noriyasu Kato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 38 days.

(21) Appl. No.: 17/695,377

(22) Filed: Mar. 15, 2022

(65) Prior Publication Data

US 2022/0336966 A1   Oct. 20, 2022

(30) Foreign Application Priority Data

Apr. 20, 2021   (JP) .................................. 2021-071233

(51) Int. Cl.
| | |
|---|---|
| *H01Q 21/24* | (2006.01) |
| *H01Q 1/42* | (2006.01) |
| *H04B 17/318* | (2015.01) |

(52) U.S. Cl.
CPC ............... *H01Q 21/24* (2013.01); *H01Q 1/42* (2013.01); *H04B 17/318* (2015.01)

(58) Field of Classification Search
CPC .......... H01Q 21/24; H01Q 1/42; H01Q 15/14; H01Q 19/195; H04B 17/318
See application file for complete search history.

(56) References Cited

U.S. PATENT DOCUMENTS 4,081,803 A   3/1978   Dempsey

FOREIGN PATENT DOCUMENTS

| JP | 7-84042 | 3/1995 | |
|---|---|---|---|
| JP | 7-226623 | 8/1995 | |
| JP | 8189957 A | * 7/1996 | ............... H01Q 3/26 |
| WO | 99/41804 | 8/1999 | |

OTHER PUBLICATIONS

Office Action dated Aug. 26, 2022 in United Kingdom Patent Application No. GB 2203416.9.

* cited by examiner

*Primary Examiner* — Hoang V Nguyen
(74) *Attorney, Agent, or Firm* — Wenderoth, Lind & Ponack, L.L.P.

(57) ABSTRACT

A device for measuring a polarization direction of a linearly polarized received wave with circularly polarized antennas includes an intensity ratio providing unit that provides, to the antennas, intensity ratios different depending on an arrival direction for the received wave; a storage unit that stores a first table in which an intensity ratio of a vertically polarized component of the received wave between two of the antennas is associated with the arrival direction and a second table in which an intensity ratio of a horizontally polarized component of the received wave between the two antennas is associated with the arrival direction; a detector that acquires an intensity ratio of the received wave; an acquiring unit that acquires the arrival direction; and an arithmetic unit that calculates the polarization direction of the received wave based on the acquired intensity ratio and the intensity ratios of the vertically and horizontally polarized components.

13 Claims, 9 Drawing Sheets

VERTICAL POLARIZATION

FIG.6

HORIZONTAL POLARIZATION

POLARIZATION DIRECTION MEASURING DEVICE, METHOD OF ACQUIRING INTENSITY RATIO TABLES, POLARIZATION DIRECTION MEASURING METHOD, AND COMPUTER-READABLE STORAGE MEDIUM

CROSS-REFERENCE TO RELATED APPLICATIONS

The present application claims priority to and incorporates by reference the entire contents of Japanese Patent Application No. 2021-071233 filed in Japan on Apr. 20, 2021.

FIELD

The present disclosure relates to a polarization direction measuring device, a method of acquiring intensity ratio tables, a polarization direction measuring method, and a computer-readable storage medium that measure a polarization direction of a received wave.

BACKGROUND

In conventional art, an obstacle detecting radar including a polarization detector as a measuring device measuring the polarization direction of the received wave is known (for example, see Japanese Patent Application Laid-open No. H07-084042). The polarization detector includes first to fourth wave detectors, and an ECU connected to the first to the fourth wave detectors calculates the received polarization on the basis of the received voltages from the first to the fourth wave detectors.

Circularly polarized antennas exist as antennas receiving received waves. Because circularly polarized antennas have broader band property than that of linearly polarized antennas, circularly polarized antennas are adopted in systems receiving radio waves ranging over broad bands. By contrast, circularly polarized antennas receive received waves in any polarization directions, such as horizontal polarizations, vertical polarizations, and oblique polarizations, regardless of the polarization direction. For this reason, it is difficult to measure the polarization direction of linearly polarized received waves with circularly polarized antennas.

For this reason, an object of the present disclosure is to provide a polarization direction measuring device, a method of acquiring an intensity ratio table, a polarization direction measuring method, and a computer-readable storage medium, which are capable of measuring a polarization direction of a linearly polarized received wave to be received at a circularly polarized antenna.

SUMMARY OF THE INVENTION

A polarization direction measuring device according to one aspect of the present disclosure is for measuring a polarization direction of a linearly polarized received wave with a plurality of circularly polarized antennas. The measuring device includes: an intensity ratio providing unit that provides, to the plurality of circularly polarized antennas, intensity ratios different depending on an arrival direction for the received wave to be received at the plurality of circularly polarized antennas; a storage unit that stores a first intensity ratio table in which an intensity ratio of a vertically polarized component of the received wave between two of the circularly polarized antennas is associated with the arrival direction of the received wave and a second intensity ratio table in which an intensity ratio of a horizontally polarized component of the received wave between the two circularly polarized antennas is associated with the arrival direction of the received wave; a detector that acquires an intensity ratio of the received wave between two of the circularly polarized antennas; an acquiring unit that acquires the arrival direction of the received wave; and an arithmetic unit that acquires an intensity ratio of the vertically polarized component of the received wave from the first intensity ratio table based on the acquired arrival direction of the received wave, acquires an intensity ratio of the horizontally polarized component of the received wave from the second intensity ratio table based on the acquired arrival direction of the received wave, and calculates the polarization direction of the received wave from a predetermined calculation expression based on the intensity ratio of the received wave acquired by the detector, the intensity ratio of the vertically polarized component of the received wave, and the intensity ratio of the horizontally polarized component of the received wave.

A method of acquiring intensity ratio tables according to one aspect of the present disclosure is a method of acquiring the first intensity ratio table and the second intensity ratio table used in the polarization direction measuring device described above. The method includes: setting up a radio wave source for generating the received wave so that the received wave is in a predetermined arrival direction and has a predetermined polarization with respect to the plurality of circularly polarized antennas; causing the radio wave source to generate the received wave; receiving the received wave with the plurality of circularly polarized antennas; and acquiring the first intensity ratio table in which an intensity ratio of a vertically polarized component of the received wave between two of the circularly polarized antennas is associated with an arrival direction of the received wave, and the second intensity ratio table in which an intensity ratio of a horizontally polarized component of the received wave between the two circularly polarized antennas is associated with an arrival direction of the received wave.

A polarization direction method according to one aspect of the present disclosure is of measuring a polarization direction of a received wave with the polarization direction measuring device described above. The polarization direction method includes: receiving the received wave with the plurality of circularly polarized antennas; detecting, by the detector, an intensity ratio between two of the circularly polarized antennas of the received wave to be received at the plurality of circularly polarized antennas; acquiring, by the acquiring unit, an arrival direction of the received wave; acquiring, by the arithmetic unit, an intensity ratio of a vertically polarized component of the received wave from the first intensity ratio table stored in the storage unit based on the acquired arrival direction of the received wave; acquiring, by the arithmetic unit, an intensity ratio of a horizontally polarized component of the received wave from the second intensity ratio table stored in the storage unit based on the acquired arrival direction of the received wave; and calculating, by the arithmetic unit, the polarization direction of the received wave from the predetermined calculation expression based on the intensity ratio of the received wave acquired by the detector, the intensity ratio of the vertically polarized component of the received wave, and the intensity ratio of the horizontally polarized component of the received wave.

A non-transitory computer-readable storage medium according to one aspect of the present disclosure stores a polarization direction measuring program for measuring a polarization direction of a received wave. The polarization direction measuring program, when executed by a computer of the polarization direction measuring device described above, causes the polarization direction measuring device to: receive the received wave with the plurality of circularly polarized antennas; detect an intensity ratio between two of the circularly polarized antennas of the received wave to be received at the plurality of circularly polarized antennas; acquire an arrival direction of the received wave; acquire an intensity ratio of a vertically polarized component of the received wave from the first intensity ratio table stored in the storage unit based on the acquired arrival direction of the received wave; acquire an intensity ratio of a horizontally polarized component of the received wave from the second intensity ratio table stored in the storage unit based on the acquired arrival direction of the received wave; and calculate the polarization direction of the received wave from the predetermined calculation expression based on the intensity ratio of the received wave acquired by the detector, the intensity ratio of the vertically polarized component of the received wave, and the intensity ratio of the horizontally polarized component of the received wave.

The present disclosure enables the measurement of the polarization direction of a linearly polarized received wave to be received at circularly polarized antennas.

DESCRIPTION OF EMBODIMENTS

Embodiments according to the present disclosure will be described in detail on the basis of the drawings. The present invention is not limited to the particular embodiments described herein. Constituent elements in the following embodiments include elements that can be replaced by the skilled person and obvious ones, or substantially the same ones. The constituent elements described hereinafter may be properly used in combination and, when a plurality of embodiments exist, some of the embodiments may be combined.

First Embodiment

A polarization direction measuring device 1 and a polarization direction measuring method according to a first embodiment serve as a device and a method for measuring a polarization direction of a received wave serving as a linearly polarized wave and received at circularly polarized antennas 5. The received wave is a radio wave and, for example, a beam of a detection radar. The measuring device 1 is provided in, for example, a transport machine, such as an airplane, a vehicle, and a ship. The received wave in a predetermined arrival direction is received at the circularly polarized antennas 5, and the arrival direction of the received wave is determined by an angle (AZ angle) in an azimuth direction (hereinafter referred to as "AZ direction") and an angle (EL angle) in an elevation direction (hereinafter referred to as "EL direction").

Figure 1:
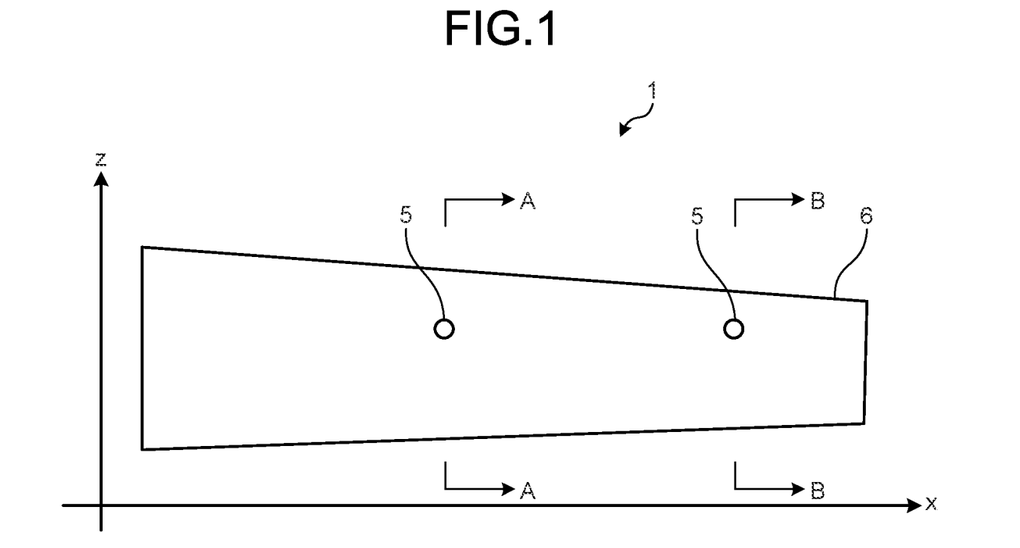
FIG. 1 is a schematic block diagram illustrating part of a polarization direction measuring device according to a first embodiment.
Figure 2:
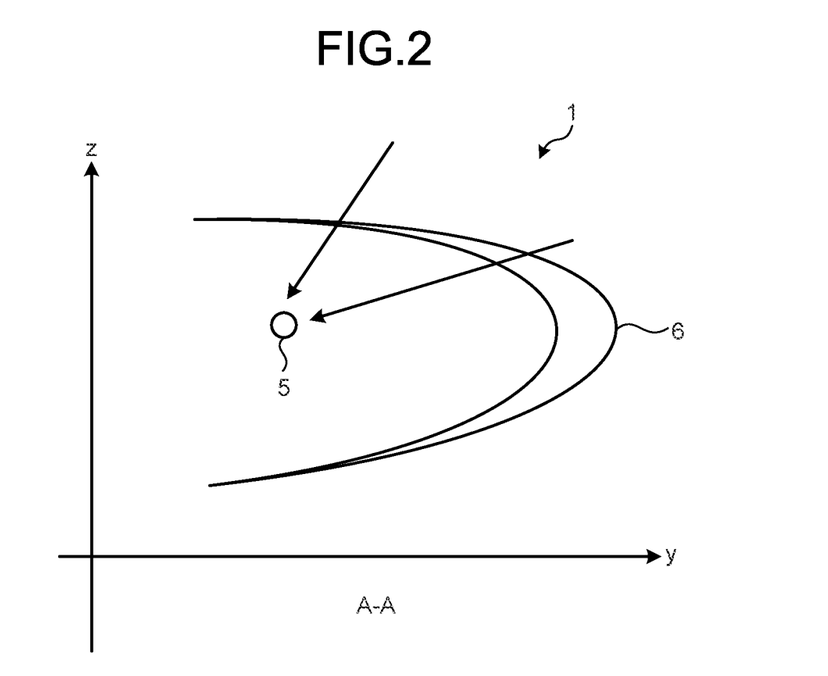
FIG. 2 is a cross-sectional view taken along line A-A in FIG. 1.
Figure 3:
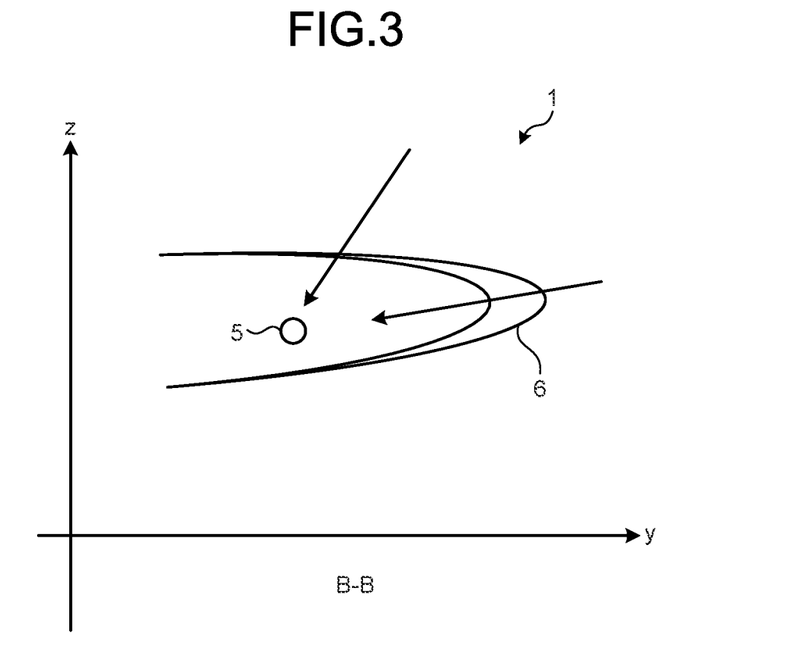
FIG. 3 is a cross-sectional view taken along line B-B in FIG. 1.
Figure 4:
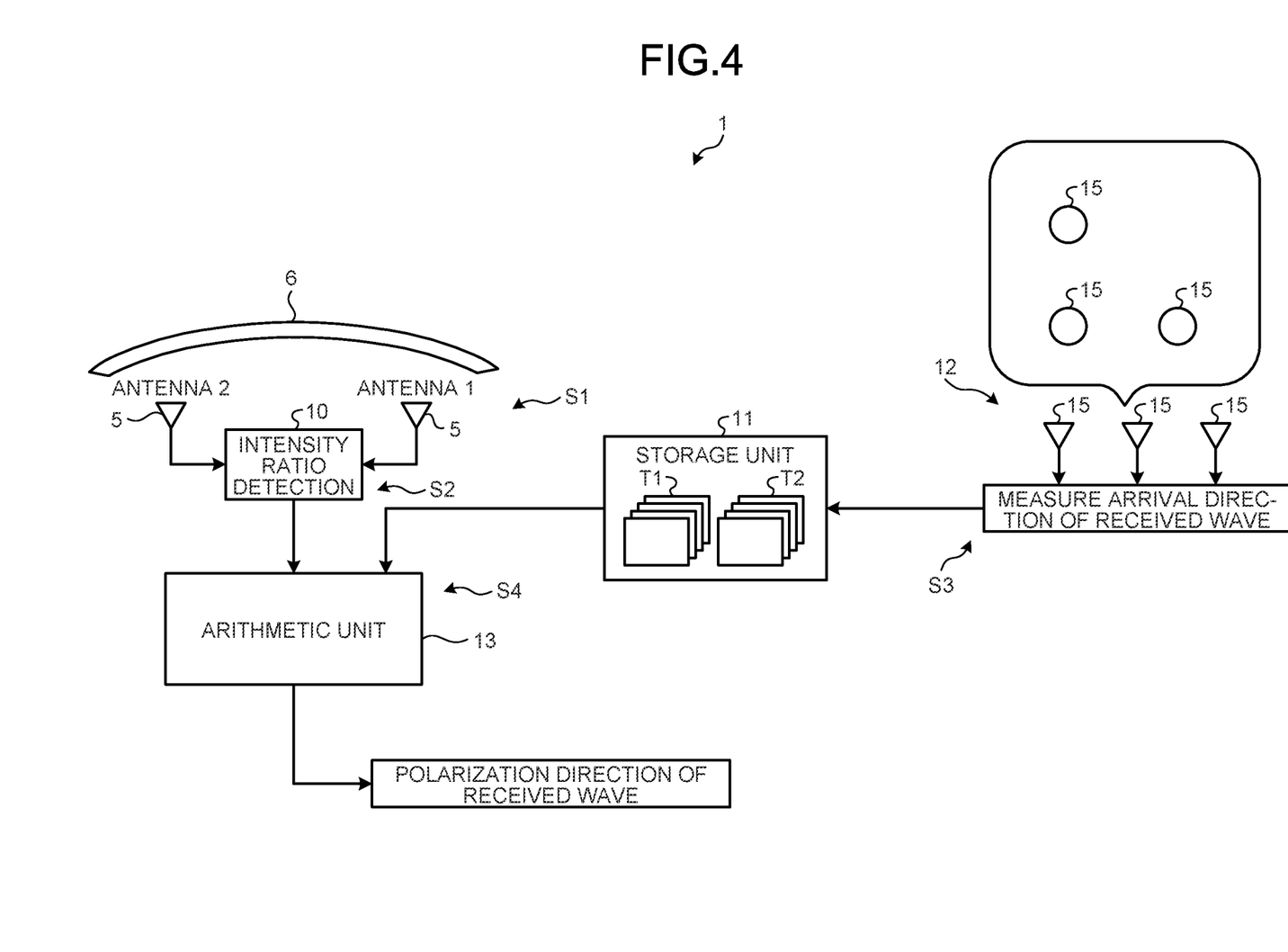
FIG. 4 is an explanatory drawing relating to the polarization direction measuring device and a polarization direction measuring method according to the first embodiment.
Figure 5:
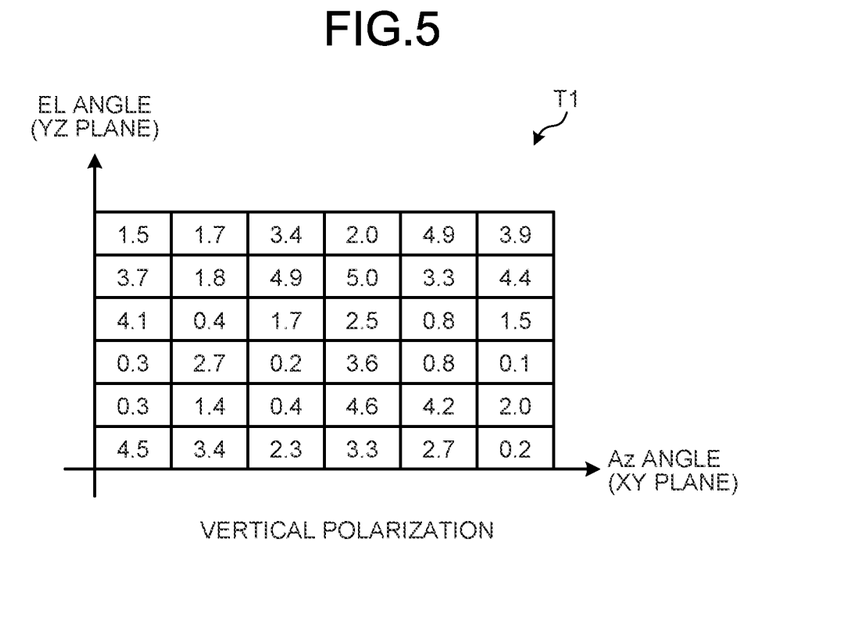
FIG. 5 is a diagram illustrating a first intensity ratio table relating to a vertically polarized component of the received wave.
Figure 6:
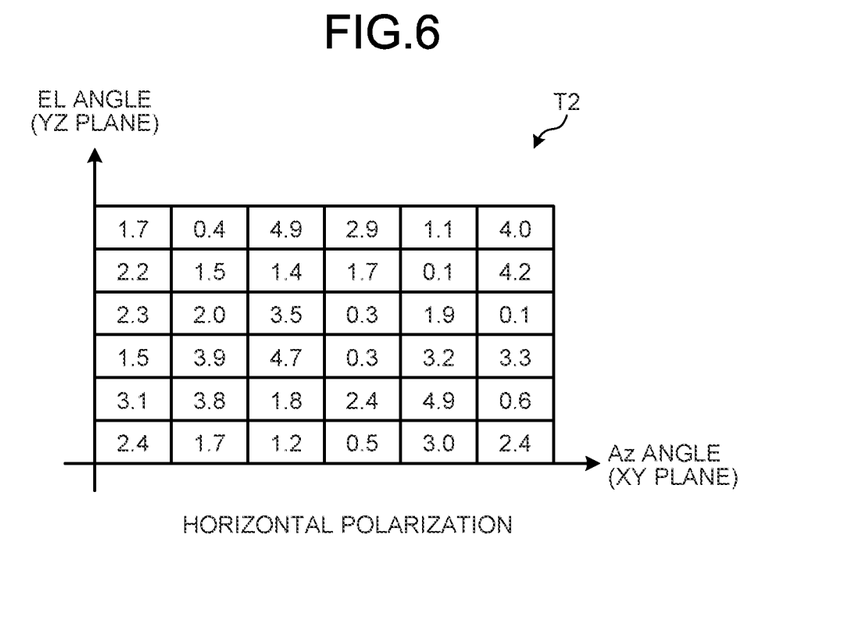
FIG. 6 is a diagram illustrating a second intensity ratio table relating to a horizontally polarized component of the received wave.
Figure 7:
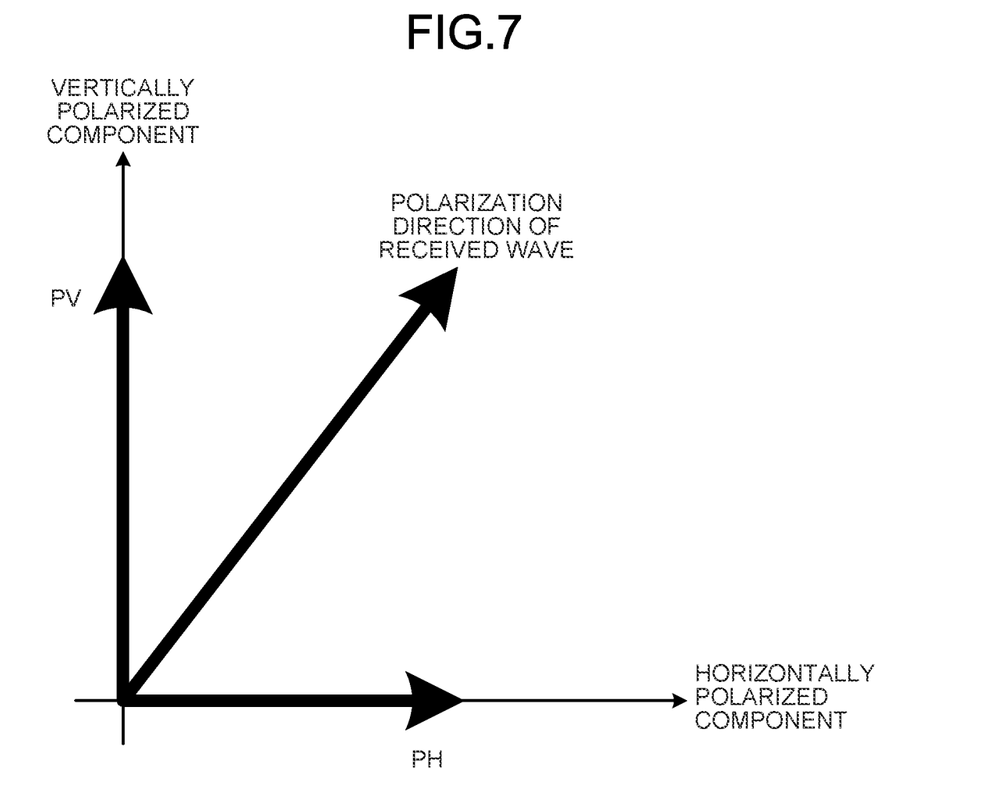
FIG. 7 is an explanatory drawing relating to a polarization direction of the received wave.
Figure 8:
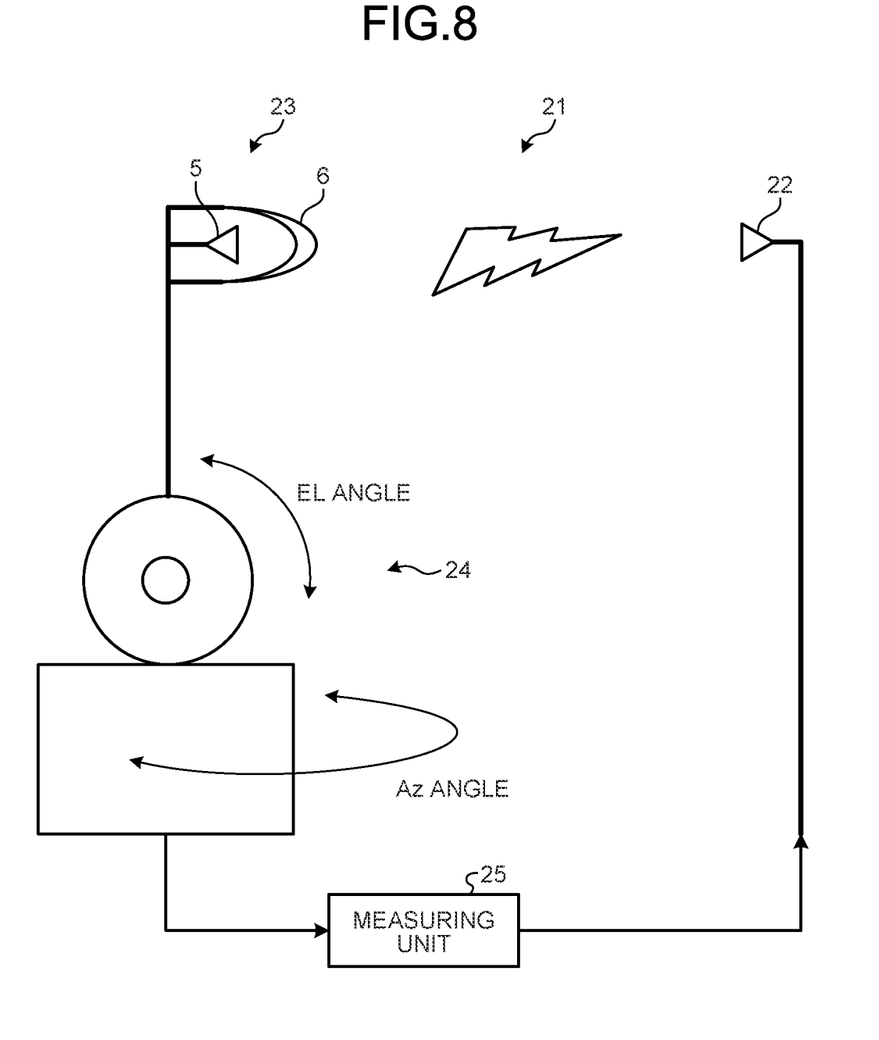
FIG. 8 is a schematic block diagram of an device used for a method for acquiring intensity ratio tables.

FIG. 1 is a schematic block diagram illustrating part of a polarization direction measuring device according to a first embodiment. FIG. 2 is a cross-sectional view taken along line A-A in FIG. 1. FIG. 3 is a cross-sectional view taken along line B-B in FIG. 1. FIG. 4 is an explanatory drawing relating to the polarization direction measuring device and the polarization direction measuring method according to the first embodiment. FIG. 5 is a diagram illustrating a first intensity ratio table relating to a vertically polarized component of the received wave. FIG. 6 is a diagram illustrating a second intensity ratio table relating to a horizontally polarized component of the received wave. FIG. 7 is an explanatory drawing relating to a polarization direction of the received wave. FIG. 8 is a schematic block diagram of a device used for a method for acquiring intensity ratio tables.

Polarization Direction Measuring Device

As illustrated in FIG. 1 to FIG. 3, the measuring device 1 includes a plurality of circularly polarized antennas 5 and a radome 6. The circularly polarized antennas 5 have one-dimensional arrangement in which a plurality of circularly polarized antennas 5 are arranged in a straight line along the AZ direction (x direction in FIG. 1) and one circularly polarized antenna 5 is provided in the EL direction (z direction in FIG. 1 to FIG. 3). The first embodiment adopts one-dimensional arrangement to suppress the height in the EL direction, but arrangement is not particularly limited thereto. The number of circularly polarized antennas 5 is two or more. The first embodiment illustrates the structure using two circularly polarized antennas 5. The circularly polarized antennas 5 are arranged at a predetermined interval in the AZ direction.

The radome 6 is provided on, for example, a wing of an airplane. The radome 6 functions as an intensity ratio providing unit providing different intensity ratios to the signal intensity ratio between the circularly polarized antennas 5 according to the arrival direction of a received wave. The wing length direction of the wing of the airplane serves as the AZ direction. Specifically, the radome 6 has a non-uniform shape in a three-dimensional space including the AZ direction and the EL direction. As illustrated in FIG. 2, in a cross-sectional shape of the radome 6 cut in a position on a wing root side (left side in FIG. 1) in the AZ direction, the inner space is broad in the EL direction. By contrast, as illustrated in FIG. 3, in a cross-sectional shape of the radome 6 cut in a position on a wing tip side (right side in FIG. 1) in the AZ direction, the inner space is narrow in the EL direction. For this reason, the radome 6 causes the incident angle of the received wave on an incident surface of the radome 6 on which the received wave is made incident to differ in a three-dimensional manner. In addition, also in the cross sections illustrated in FIG. 2 and FIG. 3, the thickness of the radome 6 is not fixed, but is different in the EL direction.

When the incident angle of the linearly polarized received wave differs on the incident surface of the radome 6, the incident angle characteristic of the transmittance of the received wave transmitted through the radome 6 differs between a vertically polarized component and a horizontally polarized component of the received wave. For this reason, by varying the incident angle of the received wave made incident on the circularly polarized antennas 5, it is possible to vary the intensity ratio of the signal intensity of the received wave to be received at one circularly polarized antenna 5 to a signal intensity of the received wave to be received at the other circularly polarized antenna 5.

The radome 6 has a layered structure, and may be provided with different intensity ratios according to the arrival direction of the received wave by varying the shape, varying the layered structure, or varying both the shape and the layered structure.

In addition, as illustrated in FIG. 4, the measuring device 1 includes a detector 10, a storage unit 11, an acquiring unit 12, and an arithmetic unit 13.

The detector 10 is connected to the two circularly polarized antennas 5, and detects an intensity ratio of signal intensities of the two circularly polarized antennas 5. In the first embodiment, "antenna 1" and "antenna 2" are applied as the two circularly polarized antennas 5. Specifically, in the first embodiment, the detector 10 detects an intensity ratio of "antenna 1" to "antenna 2" as an intensity ratio of the two circularly polarized antennas 5. Although the detector 10 detects an intensity ratio, it suffices that the detector 10 detects at least the intensity ratio, and the detector 10 may detect the frequency, if necessary.

The storage unit 11 stores therein a first intensity ratio table T1 illustrated in FIG. 5 and a second intensity ratio table T2 illustrated in FIG. 6. The first intensity ratio table T1 is data associating an intensity ratio (TV) of a vertically polarized component of the received wave between the two circularly polarized antennas 5 with the arrival direction of the received wave. In FIG. 5, the horizontal axis indicates the AZ angle, and the vertical axis indicates the EL angle. In addition, the first intensity ratio table T1 is formed of a plurality of cells each associated with the AZ angle and the EL angle. Each of the cells is associated with an intensity ratio. For this reason, the AZ angle and the EL angle are associated with the cell to which the intensity ratio is associated. The first intensity ratio table T1 is prepared at least for each of frequencies. In the first embodiment, the first intensity ratio table T1 for the "antenna 1" and the "antenna 2" is prepared as the first intensity ratio table T1. The second intensity ratio table T2 is data associating an intensity ratio (TH) of a horizontally polarized component of the received wave between the two circularly polarized antennas 5 with the arrival direction of the received wave. In FIG. 6, the horizontal axis indicates the AZ angle, and the vertical axis indicates the EL angle, in the same manner as FIG. 5. The second intensity ratio table T2 is a table acquired by replacing the vertically polarized component of the first intensity ratio table T1 with the horizontally polarized component, and substantially the same as the first intensity ratio table T1. For this reason, an explanation of the second intensity ratio table T2 will be omitted. In addition, although illustration thereof is omitted, the storage unit 11 stores therein a program to measure the polarization direction of the received wave using the measuring device 1. The first intensity ratio table T1 and the second intensity ratio table T2 include mathematical expressions based on the first intensity ratio table T1 and the second intensity ratio table T2, as well as the first intensity ratio table T1 illustrated in FIG. 5 and the second intensity ratio table T2 illustrated in FIG. 6.

The acquiring unit 12 acquires the arrival direction of the received wave. Specifically, the acquiring unit 12 is a direction detection unit that detects the arrival direction of the received wave on the basis of the received wave to be received at a plurality of antennas 15. The acquiring unit 12 calculates the arrival direction of the received wave from a predetermined calculation expression, on the basis of a phase difference $\Delta\Theta$ and a wavelength $\lambda$ of the received wave to be received in the antennas 15 and a distance d between the antennas 15. The predetermined calculation expression is an expression of phase difference direction detection generally known, and "$\Theta = \sin^{-1}(\Delta \cdot \lambda / 2\pi d)$" or the like is used. The acquiring unit 12 has a structure in which the antennas 15 are arranged in a two-dimensional manner, that is, three antennas 15 are arranged adjacent to each other in the AZ direction and the EL direction, as illustrated in FIG. 4, to acquire the arrival direction of the received wave in the three-dimensional direction.

The arithmetic unit 13 calculates a polarization direction of the received wave. Specifically, the arithmetic unit 13 acquires an intensity ratio (TV) of a vertically polarized component of the received wave from the first intensity ratio table T1, and acquires an intensity ratio (TH) of a horizontally polarized component of the received wave from the second intensity ratio table T2, on the basis of the arrival direction of the received wave acquired with the acquiring unit 12. The arithmetic unit 13 also acquires an intensity ratio (M) of the received wave acquired with the detector 10. The arithmetic unit 13 calculates the polarization direction of the received wave from the predetermined calculation expression on the basis of the intensity ratio (M) of the received wave, the intensity ratio (TV) of the vertically polarized component of the received wave, and the intensity ratio (TH) of the horizontally polarized component of the received wave.

The predetermined calculation expression is the following expression (1) to determine the ratio of the horizontally polarized component PH and the following expression (2) to determine the ratio of the vertically polarized component PV.

$$PH = (M-TV)/(TH-TV) \tag{1}$$

$$PV = 1 - PH \tag{2}$$

As illustrated in FIG. 7, the arithmetic unit 13 calculates the polarization direction of the received wave from the ratio of the horizontally polarized component determined with the expression (1) and the ratio of the vertically polarized component determined with the expression (2).

Method of Acquiring Intensity Ratio Table

The following is an explanation of a method for acquiring intensity ratio tables to acquire the first intensity ratio table T1 and the second intensity ratio table T2 used for the measuring device 1, with reference to FIG. 8. An acquiring device 21 illustrated in FIG. 8 is used for acquiring the first intensity ratio table T1 and the second intensity ratio table T2. In the following explanation, the tables are also simply referred to as "intensity ratio tables T1 and T2". The acquiring device 21 includes a transmitter 22, a receiver 23, an operating unit 24, and a measuring unit 25.

The transmitter 22 transmits a radio wave (received wave) serving as a linearly polarized wave having a predetermined polarization direction to the receiver 23. The receiver 23 is equivalent to the circularly polarized antennas 5 and the radome 6 of the measuring device 1, and acquires the received radio wave as a received wave. The operating unit 24 moves the receiver 23 such that the position of the transmitter 22 as viewed from the receiver 23 has a predetermined AZ angle and a predetermined EL angle. The measuring unit 25 sets the transmission frequency and the polarization direction of the transmitter 22, acquires the intensity ratio of the received wave to be received in the receiver 23, and acquires the AZ angle and the EL angle in the acquisition.

In the method for acquiring the intensity ratio tables T1 and T2, the acquiring device 21 executes a step of operating the operating unit 24 such that the receiver 23 including the two circularly polarized antennas 5 is positioned in the arrival direction having the predetermined AZ angle and the predetermined EL angle. Thereafter, in the acquiring method, a step is executed to generate a radio wave having the predetermined frequency and the predetermined polarization direction from the transmitter 22 serving as the radio wave source. In addition, in the acquiring method, a step is executed to receive the radio wave having the predetermined frequency and the predetermined polarization direction as the received wave with the receiver 23. In the acquiring method, when the received wave is received with the receiver 23, the measuring unit 25 measures an intensity ratio of each of the vertically polarized components and the horizontally polarized component of the received wave between the two circularly polarized antennas 5. In the acquiring method, a step is executed to associate the AZ angle and the EL angle in the acquisition with the measured intensity ratio of the vertically polarized component of the received wave between the two circularly polarized antennas 5, and acquire the information as the first intensity ratio table T1 for each of frequencies of the received wave. In addition, in the acquiring method, a step is executed to associate the AZ angle and the EL angle in the acquisition with the measured intensity ratio of the horizontally polarized component of the received wave between the two circularly polarized antennas 5, and acquire the information as the second intensity ratio table T2 for each of frequencies of the received wave.

The intensity ratio tables T1 and T2 prepared for the respective frequencies of the received wave may be subjected to interpolation to interpolate a difference in intensity between the frequencies. Although each of the cells in the intensity ratio tables T1 and T2 is associated with the arrival direction formed of the AZ angle and the EL angle, interpolation may be executed to interpolate the AZ angle and the EL angle between the cells.

Polarization Direction Measuring Method

The following is an explanation of a polarization direction measuring method of measuring the polarization direction of a linearly polarized received wave with the measuring device 1, with reference to FIG. 4.

In the measuring method, first, step S1 is executed to receive the received wave with the two circularly polarized antennas 5. Thereafter, in the measuring method, step S2 is executed with the detector 10 to detect an intensity ratio between the two circularly polarized antennas 5 on the basis of the received wave to be received at the two circularly polarized antennas 5. In addition, in the measuring method, step S3 is executed with the acquiring unit 12 to acquire the arrival direction of the received wave. In the measuring method, step S4 is executed with the arithmetic unit 13 to acquire the intensity ratio of the vertically polarized component of the received wave from the first intensity ratio table T1 stored in the storage unit 11 and acquire the intensity ratio of the horizontally polarized component of the received wave from the second intensity ratio table T2, on the basis of the acquired arrival direction of the received wave. At step S4, the arithmetic unit 13 calculates the polarization direction of the received wave, on the basis of the intensity ratio (M) of the received wave, the intensity ratio (TV) of the vertically polarized component of the received wave, and the intensity ratio (TH) of the horizontally polarized component of the received wave, from the predetermined calculation expression. In the measuring method according to the first embodiment, the corresponding first intensity ratio table T1 and the second intensity ratio table T2 may be used on the basis of the frequency of the received wave.

Second Embodiment

Figure 9:
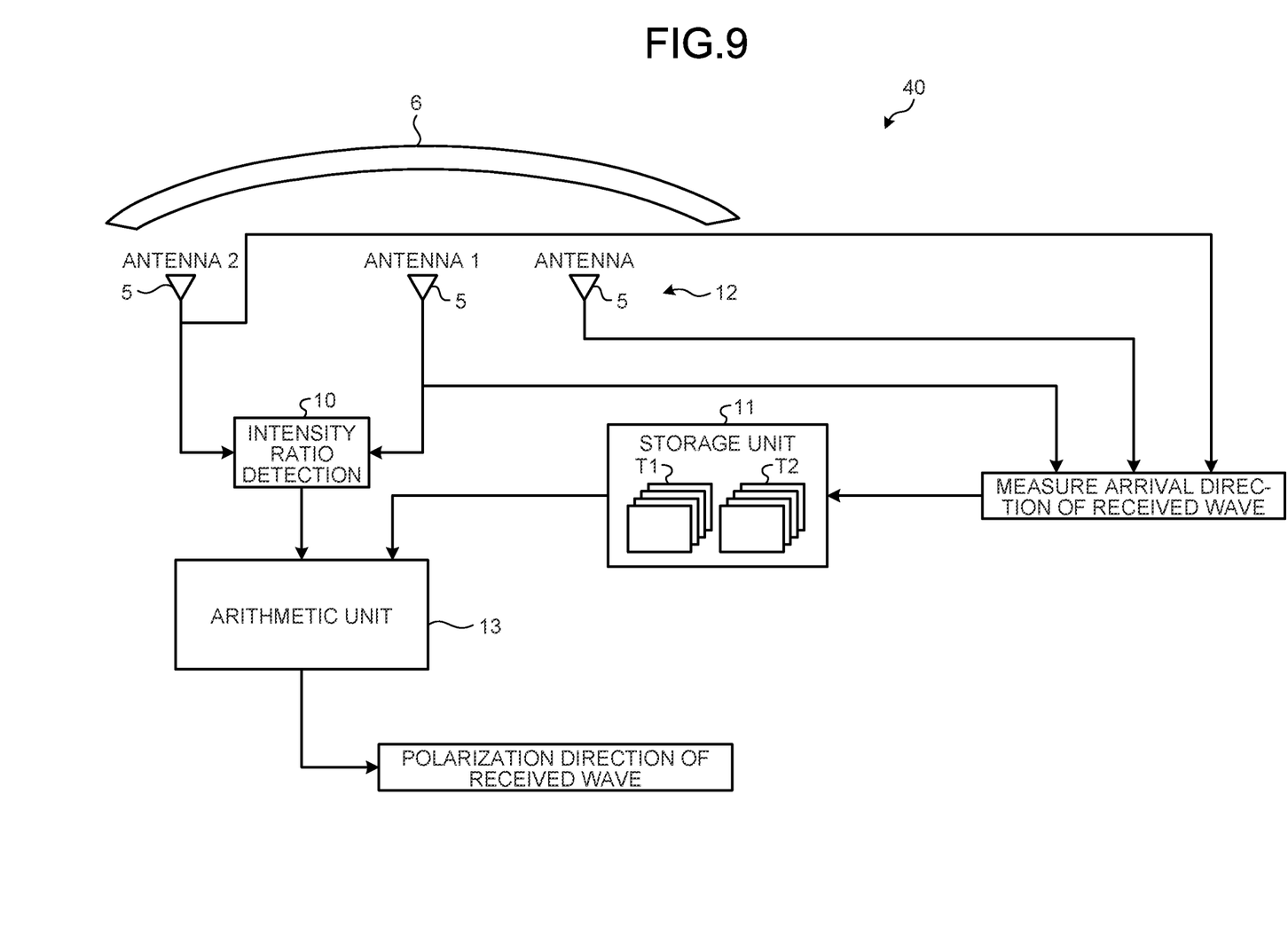
FIG. 9 is an explanatory drawing of an example relating to a polarization direction measuring device and a polarization direction measuring method according to a second embodiment.

The following is an explanation of a second embodiment with reference to FIG. 9. In the second embodiment, parts different from those of the first embodiment will be explained to avoid overlapping description, and parts serving as the same structural elements as that of the first embodiment will be explained with the same reference numerals. FIG. 9 is an explanatory drawing of an example relating to a polarization direction measuring device and a polarization direction measuring method according to the second embodiment.

In the measuring device 1 according to the first embodiment, the acquiring unit 12 acquires the arrival direction of the received wave using the antennas 15. In a measuring device 40 according to the second embodiment, an acquiring unit 12 acquires the arrival direction of the received wave using a plurality of circularly polarized antennas 5. Specifically, in the second embodiment, the circularly polarized antennas 5 are used to detect the intensity ratio of the received wave and acquire the arrival direction of the received wave.

Specifically, the acquiring unit 12 is a direction detection unit that detects the arrival direction of the received wave on the basis of the received wave to be received at the circularly polarized antennas 5. In the same manner as the first embodiment, the acquiring unit 12 calculates the arrival direction of the received wave from a predetermined calculation expression, on the basis of a phase difference $\Delta\Theta$ and a wavelength $\lambda$ of the received wave to be received in the circularly polarized antennas 5 and a distance d between the antennas 5. The acquiring unit 12 has a structure in which the circularly polarized antennas 5 are arranged in a two-dimensional manner, that is, three circularly polarized antennas 5 are arranged adjacent to each other in the AZ direction and the EL direction, in the same manner as FIG. 4, to acquire the arrival direction of the received wave in the three-dimensional direction.

Third Embodiment

Figure 10:
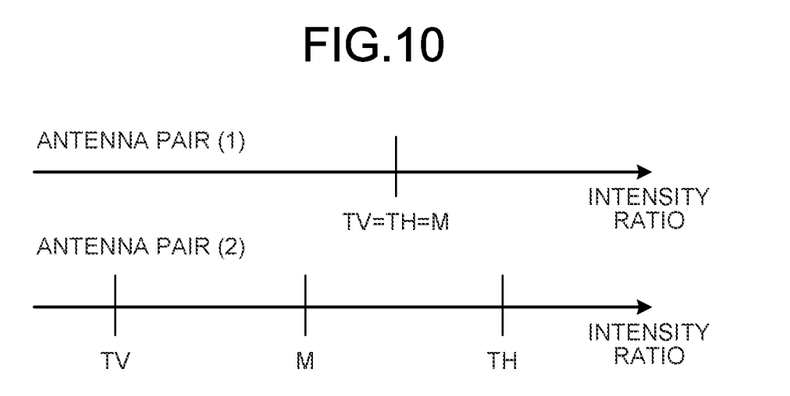
FIG. 10 is an explanatory drawing of an example relating to a polarization direction measuring device and a polarization direction measuring method according to a third embodiment.

The following is an explanation of a third embodiment with reference to FIG. 10. In the third embodiment, parts different from those of the first and the second embodiments will be explained to avoid overlapping description, and parts serving as the same structural elements as those of the first and the second embodiments will be explained with the same reference numerals. FIG. 10 is an explanatory drawing of an example relating to a polarization direction measuring device and a polarization direction measuring method according to the third embodiment.

In the third embodiment, a plurality of circularly polarized antennas 5 are provided to form two or more combinations (pairs) each including two circularly polarized antennas 5. Specifically, at least three circularly polarized antennas 5 are provided to form two different antenna pairs. FIG. 10 illustrates a predetermined antenna pair as "antenna pair (1)" and the other predetermined antenna pair as "antenna pair (2)".

In the third embodiment, the arithmetic unit 13 changes a predetermined combination of the circularly polarized antennas 5 to the other combination of the circularly polarized antennas 5 on the basis of a prescribed changing condition, and calculates the polarization direction of the received wave. In the third embodiment, for example, the arithmetic unit 13 changes the antenna pair from the antenna pair (1) to the antenna pair (2).

Specifically, in the third embodiment, the changing condition is a condition that the intensity ratio (TV) of the vertically polarized component of the received wave acquired from the first intensity ratio table T1 coincides with the intensity ratio (TH) of the horizontally polarized component of the received wave acquired from the second intensity ratio table T2. Specifically, as illustrated in the expression (1) of the first embodiment, in the case where "TV=TH" is satisfied, the polarization direction of the received wave cannot be calculated because the denominator of the right side of the expression (1) is 0. For this reason, in the case of using the changing condition that the intensity ratio (TV) coincides with the intensity ratio (TH), the arithmetic unit 13 changes the antenna pair from the antenna pair (1) satisfying "TV=TH" to the antenna pair (2) satisfying "TV≠TH". In this manner, the arithmetic unit 13 prevents the denominator of the right side of the expression (1) from being set to 0 to calculate the polarization direction of the received wave.

Fourth Embodiment

Figure 11:
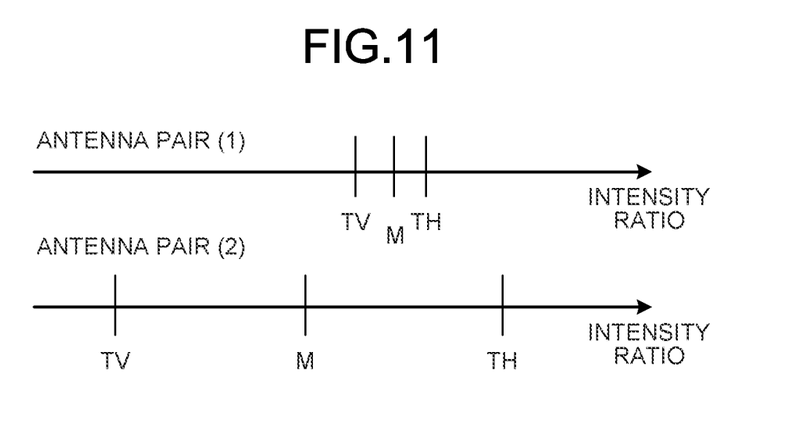
FIG. 11 is an explanatory drawing of an example relating to a polarization direction measuring device and a polarization direction measuring method according to a fourth embodiment.

The following is an explanation of a fourth embodiment with reference to FIG. 11. In the fourth embodiment, parts different from those of the first to the third embodiments will be explained to avoid overlapping description, and parts serving as the same structural elements as those of the first to the third embodiments will be explained with the same reference numerals. FIG. 11 is an explanatory drawing of an example relating to a polarization direction measuring device and a polarization direction measuring method according to the fourth embodiment.

In the fourth embodiment, a plurality of circularly polarized antennas 5 are provided to form two or more combinations (pairs) each including two circularly polarized antennas 5, in the same manner as the third embodiment. In the fourth embodiment, the arithmetic unit 13 changes a predetermined combination of the circularly polarized antennas 5 to the other combination of the circularly polarized antennas 5 on the basis of the prescribed changing condition, and calculates the polarization direction of the received wave. In the fourth embodiment, for example, the arithmetic unit 13 changes the antenna pair from the antenna pair (1) to the antenna pair (2).

Specifically, in the fourth embodiment, the changing condition is a condition that a difference between the intensity ratio (TV) of the vertically polarized component of the received wave acquired from the first intensity ratio table T1 and the intensity ratio (TH) of the horizontally polarized component of the received wave acquired from the second intensity ratio table T2 is smaller in the predetermined combination of the circularly polarized antennas 5 than the difference in the other combination of the circularly polarized antennas 5. Specifically, when the difference in intensity between TV and TH is small as illustrated in FIG. 11, an influence of an error increases and causes a decrease in the accuracy of calculation of the polarization direction of the received wave. For this reason, when the difference in intensity between the intensity ratio (TV) and the intensity ratio (TH) satisfies the changing condition described above, the arithmetic unit 13 changes the antenna pair from the antenna pair (1) having a small difference in intensity to the antenna pair (2) having a larger difference in intensity than that of the antenna pair (1). This increases the difference in intensity between TV and TH and causes the arithmetic unit 13 to suppress an influence of an error and secure the accuracy of calculation of the polarization direction of the received wave.

In the fourth embodiment, a plurality of polarization directions of the received wave may be calculated from a plurality of antenna pairs, and processing may be executed to average the calculated polarization directions of the received wave.

Fifth Embodiment

Figure 12:
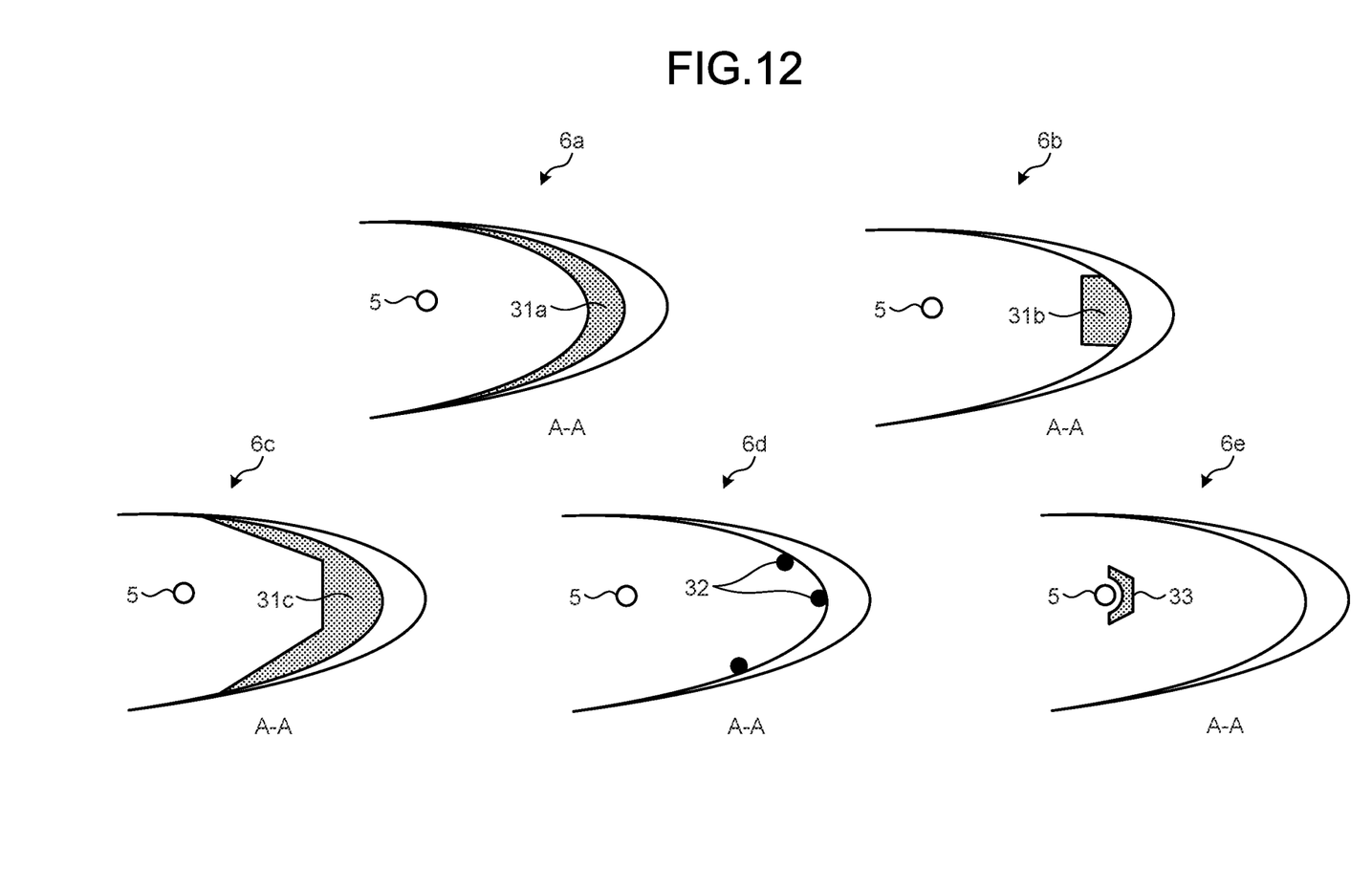
FIG. 12 is a cross-sectional view illustrating examples of a shape of a radome of a polarization direction measuring device according to a fifth embodiment.

The following is an explanation of a fifth embodiment with reference to FIG. 12. In the fifth embodiment, parts different from those of the first to the fourth embodiments will be explained to avoid overlapping description, and parts serving as the same structural elements as those of the first to the fourth embodiments will be explained with the same reference numerals. FIG. 12 is a cross-sectional view illustrating examples of a shape of a radome of a measuring device according to the fifth embodiment.

In the measuring methods according to the first to the fourth embodiments, the radome 6 provides different intensity ratios according to the arrival direction of the received wave, but the structure may include a region provided with no different intensity ratios or a region in which provision of ratios is insufficient according to the arrival direction of the received wave.

For this reason, the fifth embodiment has a structure in which a material to change an electrical characteristic is added to the radome 6 of the measuring device 1, as illustrated in FIG. 12. For example, a dielectric or a good conductor, such as metal, may be used as the material to change an electrical characteristic. The following explanation illustrates the embodiment as a structure in which a dielectric 31 is added. The dielectric 31 may be any dielectric as long as it can provide different intensity ratios according to the arrival direction of the received wave. For example, each of dielectrics 31*a* to 31*c*, 32, and 33 in FIG. 12 may be disposed. In a radome 6*a* in FIG. 12, a dielectric 31*a* is provided to follow the inside of the radome 6*a*, and the dielectric 31*a* includes an inner surface being a curved surface. In a radome 6b in FIG. 12, a dielectric 31b is provided in a block shape projecting from the inside of the radome 6b. In a radome 6c in FIG. 12, a dielectric 31c is provided to follow the inside of the radome 6c. The dielectric 31c includes an inner surface opposed to the circularly polarized antenna 5 and being a flat surface, and surfaces connected to both sides of the flat surface in the EL direction are also flat surfaces. In a radome 6d in FIG. 12, dielectrics 32 serving as separate members are attached to the inside of the radome 6d. A radome 6e in FIG. 12 is provided with a cap-like dielectric 33 covering the circularly polarized antenna 5.

Although illustration thereof is omitted, a material to change an electrical characteristic, such as a dielectric 31, may be disposed on the outside of the radome 6. For example, in the case where the measuring device 1 is mounted on an airplane, the airframe disposed outside the radome 6 may be used as the material to change the electrical characteristic. Specifically, the airframe disposed outside the radome 6 may function as an intensity ratio providing unit providing different intensity ratios according to the arrival direction of the received wave. As another embodiment of the intensity ratio providing unit, the circularly polarized antennas 5 themselves may be caused to function as an intensity ratio providing unit by setting the gain of the elements of the circularly polarized antennas 5 to a gain that is spatially non-uniform. The intensity ratio providing unit is capable of generating different intensity ratios according to the arrival direction, because the gain is spatially non-uniform.

As another example, the material to change the electrical characteristic according to the fifth embodiment may be applied in the case of providing different phase differences according to the arrival direction of the received wave, when a plurality of circularly polarized antennas 5 are used to acquire the arrival direction of the received wave as described in the second embodiment. Specifically, different phase differences may be provided according to the arrival direction of the received wave, by adding the material to change the electrical characteristic to the radome 6. As another example, even when a plurality of circularly polarized antennas 5 are used to acquire the arrival direction of the received wave as described in the second embodiment, no different phase differences may be provided according to the arrival direction of the received wave, but only the intensity ratios may be provided. Specifically, whether to apply the fifth embodiment may be selected according to the structure of the acquiring unit 12. As another example, only the intensity ratios may be provided, or both intensity ratios and phase differences may be provided, even when the fifth embodiment is applied.

In the first to the fifth embodiments, the polarization direction of the received wave is measured using the intensity ratio tables T1 and T2 formed by acquiring intensity ratios in the respective cells while the AZ angle and the EL angle are changed, but the structure is not limited thereto. For example, the intensity ratio tables T1 and T2 may be generated by acquiring intensity ratios in the respective cells while the radome 6 is deformed under load, and the polarization direction of the received wave may be measured using the generated intensity ratio tables T1 and T2 in consideration of the deformation under the load of the radome 6.

As described above, the polarization direction measuring devices 1 and 40, the method of acquiring the intensity ratio tables T1 and T2, the polarization direction measuring method, and the a computer-readable storage medium described in the embodiments are recognized, for example, as follows.

Each of the polarization direction measuring devices 1 and 40 according to a first aspect is a polarization direction measuring device 1 or 40 for measuring a polarization direction of a linearly polarized received wave with a plurality of circularly polarized antennas 5, and including: an intensity ratio providing unit (radome 6, dielectric 31, a good conductor, an antenna element having a gain that is spatially non-uniform) that provides, to the plurality of circularly polarized antennas 5, intensity ratios different depending on an arrival direction for the received wave to be received at the plurality of circularly polarized antennas; a storage unit 11 that stores a first intensity ratio table T1 in which an intensity ratio of a vertically polarized component of the received wave between two of the circularly polarized antennas is associated with the arrival direction of the received wave and a second intensity ratio table T2 in which an intensity ratio of a horizontally polarized component of the received wave between the two circularly polarized antennas is associated with the arrival direction of the received wave; a detector 10 that acquires an intensity ratio of the received wave between two of the circularly polarized antennas 5; an acquiring unit that acquires the arrival direction of the received wave; and an arithmetic unit 13 that acquires an intensity ratio of the vertically polarized component of the received wave from the first intensity ratio table T1 based on the acquired arrival direction of the received wave, acquires an intensity ratio of the horizontally polarized component of the received wave from the second intensity ratio table T2 based on the acquired arrival direction of the received wave, and calculates the polarization direction of the received wave from a predetermined calculation expression based on the intensity ratio of the received wave acquired by the detector, the intensity ratio of the vertically polarized component of the received wave, and the intensity ratio of the horizontally polarized component of the received wave.

This structure enables measurement of the polarization direction of the received wave even when the received wave serving as a linearly polarized wave is received using the circularly polarized antennas 5.

As a second aspect, the acquiring unit 12 is a direction detection unit that detects the arrival direction of the received wave based on the received wave to be received at the circularly polarized antennas 5.

This structure simplifies the structure because the circularly polarized antennas 5 can be used for detection of the intensity ratio of the received wave and acquisition of the arrival direction of the received wave.

As a third aspect, the plurality of circularly polarized antennas 5 are provided to form two or more combinations each including two of the circularly polarized antennas 5, and the arithmetic unit 13 changes one of the combinations to another combination based on a prescribed changing condition to calculate the polarization direction of the received wave.

This structure enables the setting of the combination of the circularly polarized antennas 5 to a proper combination on the basis of a prescribed changing condition, and the calculation of the polarization direction of the received wave using the proper combination of the circularly polarized antennas 5.

As a fourth aspect, the changing condition is a condition that the intensity ratio of the vertically polarized component of the received wave acquired from the first intensity ratio table T1 coincides with the intensity ratio of the horizontally polarized component of the received wave acquired from the second intensity ratio table T2.

This structure enables calculation of the polarization direction of the received wave by setting the combination of the circularly polarized antennas 5 to a proper combination, even when the calculation of the polarization direction of the received wave is difficult.

As a fifth aspect, the changing condition is a condition that a difference between the intensity ratio of the vertically polarized component of the received wave acquired from the first intensity ratio table T1 and the intensity ratio of the horizontally polarized component of the received wave acquired from the second intensity ratio table T2 is smaller for the one combination than for the other combination.

This structure enables suppression of decrease in calculation accuracy by setting the combination of the circularly polarized antennas 5 to a proper combination, even when the calculation accuracy for the polarization direction of the received wave decreases.

As a sixth aspect, the first intensity ratio table T1 and the second intensity ratio table T2 are stored for each of frequencies of the received wave, the detector 10 detects a frequency of the received wave, and the arithmetic unit 13 acquires, based on the frequency detected by the detector, the first intensity ratio table T1 and the second intensity ratio table T2 corresponding to the frequency, and acquires, from the acquired first intensity ratio table and the acquired second intensity ratio table, the intensity ratio of the vertically polarized component of the received wave and the intensity ratio of the horizontally polarized component of the received wave corresponding to the arrival direction of the received wave acquired by the acquiring unit 12.

This structure enables the acquisition of the proper intensity ratios corresponding to the frequency, and calculation of the polarization direction of the received wave corresponding to the intensity ratios with accuracy, because the first intensity ratio table T1 and the second intensity ratio table T2 can be acquired for each of the frequencies.

As a seventh aspect, the intensity ratio providing unit includes a radome 6 that houses the circularly polarized antennas 5, and the radome 6 has a non-uniform shape or a non-uniform structure in three-dimensional space.

This structure enables the provision of different intensity ratios according to the arrival direction of the received wave, with the radome 6 having a non-uniform shape or a non-uniform structure in the three-dimensional space.

As an eighth aspect, the intensity ratio providing unit is disposed in a radome 6 that houses the circularly polarized antennas 5, and has a material (dielectric 31, a good conductor) that changes an electrical characteristic of the received wave.

This structure enables the simple provision of different intensity ratios according to the arrival direction of the received wave, with the material changing the electrical properties and provided in the radome 6.

As a ninth aspect, the intensity ratio providing unit implemented as elements of the circularly polarized antennas 5 having gains which are spatially non-uniform.

This structure easily causes each of the circularly polarized antennas 5 themselves to function as the intensity ratio providing unit by setting the gain of the element of each of the circularly polarized antennas 5 to a gain that is spatially non-uniform. Specifically, this structure enables easy acquisition of differences in intensity different according to the arrival direction of the received wave by setting the gains of the elements of the circularly polarized antennas 5 to gains different between the elements.

As a tenth aspect, the arrival direction of the received wave is defined by an AZ angle, which is an angle in an azimuth direction, and an EL angle, which is an angle in an elevation direction orthogonal to the azimuth direction, and each of the first intensity ratio table T1 and the second intensity ratio table T2 has a plurality of cells each identified by an AZ angle and an EL angle, an intensity ratio is set in each cell, and intensity ratios are interpolated between the cells.

This structure enables proper interpolation of the intensity ratios between the cells, and acquisition of the intensity ratio corresponding to the arrival direction of the received wave with accuracy.

As an eleventh aspect, when the first intensity ratio table T1 and the second intensity ratio table T2 are prepared for each frequency of the received wave, intensity ratios are interpolated between the frequencies in each of the first intensity ratio table T1 and the second intensity ratio table T2.

This structure enables proper interpolation of the intensity ratios between the frequencies, acquisition of the intensity ratio between the frequencies with accuracy, and proper acquisition of the intensity ratio corresponding to the arrival direction of the received wave.

A method of acquiring intensity ratio tables T1 and T2 according to a twelfth aspect is a method of acquiring intensity ratio tables T1 and T2 used in the polarization direction measuring device 1 or 40 described above, the method comprising: setting up a radio wave source for generating the received wave so that the received wave is in a predetermined arrival direction and has a predetermined polarization with respect to the plurality of circularly polarized antennas; causing the radio wave source to generate the received wave; receiving the received wave with the plurality of circularly polarized antennas; and acquiring the first intensity ratio table T1 in which an intensity ratio of a vertically polarized component of the received wave between two of the circularly polarized antennas 5 is associated with an arrival direction of the received wave, and the second intensity ratio table T2 in which an intensity ratio of a horizontally polarized component of the received wave between the two circularly polarized antennas 5 is associated with an arrival direction of the received wave.

This structure enables the acquisition of the intensity ratio tables T1 and T2 properly associating the intensity ratio with the arrival direction of the received wave.

A polarization direction measuring method according to a thirteenth aspect is a polarization direction measuring method of measuring a polarization direction of a received wave with the polarization direction measuring device 1 or 40 described above, the polarization direction method comprising: step S1 of receiving the received wave with the plurality of circularly polarized antennas 5; step S2 of detecting, by the detector 10, an intensity ratio between two of the circularly polarized antennas of the received wave to be received at the plurality of circularly polarized antennas 5; step S3 of acquiring, by the acquiring unit 12, an arrival direction of the received wave; and step S4 of acquiring, by the arithmetic unit 13, an intensity ratio of a vertically polarized component of the received wave from the first intensity ratio table T1 stored in the storage unit 11 based on the acquired arrival direction of the received wave, acquiring, by the arithmetic unit 12, an intensity ratio of a horizontally polarized component of the received wave from the second intensity ratio table T2 stored in the storage unit 11 based on the acquired arrival direction of the received wave, and calculating, by the arithmetic unit 13, the polarization direction of the received wave from the predetermined calculation expression based on the intensity ratio of the received wave acquired by the detector 10, the intensity ratio of the vertically polarized component of the received wave, and the intensity ratio of the horizontally polarized component of the received wave.

This structure enables measurement of the polarization direction of the received wave, even when the received wave serving as a linearly polarized wave is received using the circularly polarized antennas 5.

Each of the measuring device 1 and 40 for a polarization direction described above may include a computer including at least a processor and a memory; the polarization direction measuring program may be stored on a computer-readable storage medium, such as a magnetic disk, an optical disc, or a semiconductor memory, to be executed by the computer. A non-transitory computer-readable storage medium according to a fourteenth aspect stores a polarization direction measuring program for measuring a polarization direction of a received wave, the polarization direction measuring program, when executed by a computer of the polarization direction measuring device 1 or 40 described above, causing the polarization direction measuring device to: receive the received wave with the plurality of circularly polarized antennas; detect an intensity ratio between two of the circularly polarized antennas 5 of the received wave to be received at the plurality of circularly polarized antennas 5; acquire an arrival direction of the received wave; acquire an intensity ratio of a vertically polarized component of the received wave from the first intensity ratio table T1 stored in the storage unit 11 based on the acquired arrival direction of the received wave; acquire an intensity ratio of a horizontally polarized component of the received wave from the second intensity ratio table T2 stored in the storage unit 11 based on the acquired arrival direction of the received wave; and calculate the polarization direction of the received wave from the predetermined calculation expression based on the intensity ratio of the received wave acquired by the detector 10, the intensity ratio of the vertically polarized component of the received wave, and the intensity ratio of the horizontally polarized component of the received wave.

This structure enables measurement of the polarization direction of the received wave even when a received wave serving as a linearly polarized wave is received using the circularly polarized antennas 5.

REFERENCE SIGNS LIST 1, 40 Measuring device
5 Circularly polarized antenna
6 Radome
10 Detector
11 Storage unit
12 Acquiring unit
13 Arithmetic unit
15 Antenna
21 Acquiring device
22 Transmitter
23 Receiver
24 Operating unit
25 Measuring unit
31a to 31c, 32, 33 Dielectric
T1 First intensity ratio table
T2 Second intensity ratio table

The invention claimed is:

1. A polarization direction measuring device for measuring a polarization direction of a linearly polarized received wave using a plurality of circularly polarized antennas, an arrival direction of the received wave being defined by an AZ angle and an EL angle, the measuring device comprising:

an intensity ratio providing unit configured to provide to the plurality of circularly polarized antennas intensity ratios different depending on an arrival direction for the received wave to be received at the plurality of circularly polarized antennas;

a storage unit storing:
a first intensity ratio table having a plurality of first cells, each of the first cells being identified by an AZ angle and an EL angle, a first intensity ratio of a vertically polarized component of the received wave between two of the circularly polarized antennas is set in each of the first cells associated with the arrival direction of the received wave; and
a second intensity ratio table having a plurality of second cells, each of the second cells being identified by an AZ angle and an EL angle, a second intensity ratio of a horizontally polarized component of the received wave between the two of the circularly polarized antennas is set in each of the second cells associated with the arrival direction of the received wave;

a detector configured to acquire a third intensity ratio of the received wave between the two of the circularly polarized antennas;

an acquiring unit configured to acquire the arrival direction of the received wave; and an arithmetic unit configured to:
acquire the first intensity ratio of the vertically polarized component of the received wave from the first intensity ratio table corresponding to the acquired arrival direction of the received wave,
acquire the second intensity ratio of the horizontally polarized component of the received wave from the second intensity ratio table corresponding to the acquired arrival direction of the received wave, and
calculate the polarization direction of the received wave as a ratio of the horizontally polarized component and a ratio of the vertically polarized component, the ratio of the horizontally polarized component being determined with an expression (1) and the ratio of the vertically polarized component being determined with an expression (2):

$$PH=(M-TV)/(TH-TV) \quad (1)$$

$$PV=1-PH \quad (2)$$

wherein: PH is the ratio of the horizontally polarized component,
M is the third intensity ratio,
TV is the first intensity ratio,
TH is the second intensity ratio,
PV is the ratio of the vertically polarized component, and wherein provision of different intensity ratios according to the arrival direction of the received wave by the intensity ratio providing unit is enabled by at least one of:
the intensity ratio providing unit having a non-uniform shape in three-dimensional space;
the intensity ratio providing unit having a non-uniform structure in three-dimensional space;

the intensity ratio providing unit having a material that changes an electrical characteristic of the received wave; and elements of the circularly polarized antennas having gains which are spatially non-uniform.

2. The polarization direction measuring device according to claim 1, wherein the plurality of circularly polarized antennas comprises at least three circularly polarized antennas, the acquiring unit is a direction detection unit configured to detect the arrival direction of the received wave based on the received wave to be received by the at least three circularly polarized antennas.

3. The polarization direction measuring device according to claim 1, wherein the plurality of circularly polarized antennas are provided to form two or more combinations each including two of the circularly polarized antennas, and the arithmetic unit changes one of the combinations to another combination based on a prescribed changing condition to calculate the polarization direction of the received wave.

4. The polarization direction measuring device according to claim 3, wherein the changing condition is a condition in which the first intensity ratio of the vertically polarized component of the received wave acquired from the first intensity ratio table coincides with the second intensity ratio of the horizontally polarized component of the received wave acquired from the second intensity ratio table.

5. The polarization direction measuring device according to claim 3, wherein the changing condition is a condition in which a difference between the first intensity ratio of the vertically polarized component of the received wave acquired from the first intensity ratio table and the second intensity ratio of the horizontally polarized component of the received wave acquired from the second intensity ratio table is smaller for the one combination than for the other combination.

6. The polarization direction measuring device according to claim 1, wherein the first intensity ratio table and the second intensity ratio table are stored for each of frequencies of the received wave, the detector is configured to detect a frequency of the received wave, and the arithmetic unit is configured to acquire, based on the frequency detected by the detector, the first intensity ratio table and the second intensity ratio table corresponding to the frequency, and to acquire, from the acquired first intensity ratio table and the acquired second intensity ratio table, the first intensity ratio of the vertically polarized component of the received wave and the second intensity ratio of the horizontally polarized component of the received wave corresponding to the arrival direction of the received wave acquired by the acquiring unit.

7. The polarization direction measuring device according to claim 1, wherein the intensity ratio providing unit includes a radome that houses the plurality of circularly polarized antennas, and the radome has a non-uniform shape or a non-uniform structure in three-dimensional space.

8. The polarization direction measuring device according to claim 1, wherein:

the arrival direction of the received wave is defined by the AZ angle, which is an angle in an azimuth direction, and the EL angle, which is an angle in an elevation direction orthogonal to the azimuth direction, and each of the first intensity ratio table and the second intensity ratio table has a plurality of cells each identified by an AZ angle and an EL angle, an intensity ratio is set in each cell, and first intensity ratios are interpolated between the plurality of first cells in the first intensity difference table, and second intensity ratios are interpolated between the plurality of second cells in the second intensity difference table.

9. The polarization direction measuring device polarization direction according to claim 1, wherein when the first intensity ratio table and the second intensity ratio table are prepared for each frequency of the received wave, first intensity ratios are interpolated between the frequencies in the first intensity ratio table, and second intensity ratios are interpolated between the frequencies in and the second intensity ratio table.

10. A method of acquiring the first intensity ratio table and the second intensity ratio table used in the polarization direction measuring device according to claim 1, the method comprising:

setting up a radio wave source for generating the received wave so that the received wave is in a predetermined arrival direction and has a predetermined polarization with respect to the plurality of circularly polarized antennas;

causing the radio wave source to generate the received wave;

receiving the received wave with the plurality of circularly polarized antennas; and acquiring the first intensity ratio table in which the first intensity ratio of a vertically polarized component of the received wave between two of the circularly polarized antennas is associated with an arrival direction of the received wave, and the second intensity ratio table in which the second intensity ratio of a horizontally polarized component of the received wave between the two circularly polarized antennas is associated with an arrival direction of the received wave.

11. A polarization direction method of measuring a polarization direction of a received wave using the polarization direction measuring device according to claim 1, the arrival direction of the received wave being defined by the AZ angle and the EL angle, the polarization direction method comprising:

receiving the received wave with the plurality of circularly polarized antennas;

detecting, by the detector, the third intensity ratio between two of the circularly polarized antennas of the received wave to be received at the plurality of circularly polarized antennas;

acquiring, by the acquiring unit, an arrival direction of the received wave;

acquiring, by the arithmetic unit, the first intensity ratio of a vertically polarized component of the received wave from the first intensity ratio table stored in the storage unit based on the acquired arrival direction of the received wave;

acquiring, by the arithmetic unit, the second intensity ratio of a horizontally polarized component of the received wave from the second intensity ratio table stored in the storage unit based on the acquired arrival direction of the received wave; and calculating, by the arithmetic unit, the polarization direction of the received wave as a ratio of the horizontally polarized component and a ratio of the vertically polarized component, wherein the ratio of the horizontally polarized component is determined with expression (1)

and the ratio of the vertically polarized component is determined with expression (2):

$$PH=(M-TV)/(TH-TV) \quad (1)$$

$$PV=1-PH \quad (2)$$

wherein: PH is the ratio of the horizontally polarized component,
PV is the ratio of the vertically polarized component,
TV is the first intensity ratio,
TH is the second intensity ratio, and
M is the third intensity ratio
wherein the calculating is performed from the predetermined calculation expression based on the intensity ratio of the received wave acquired by the detector, the intensity ratio of the vertically polarized component of the received wave, and the intensity ratio of the horizontally polarized component of the received wave.

12. A non-transitory computer-readable storage medium storing a polarization direction measuring program for measuring a polarization direction of a received wave, the arrival direction of the received wave being defined by an AZ angle and an EL angle, the polarization direction measuring program, when executed by a computer of the polarization direction measuring device according to claim 1, causing the polarization direction measuring device to:
receive the received wave with the plurality of circularly polarized antennas;
detect a third intensity ratio between two of the circularly polarized antennas of the received wave to be received at the plurality of circularly polarized antennas;
acquire an arrival direction of the received wave;
acquire a first intensity ratio of a vertically polarized component of the received wave from the first intensity ratio table stored in the storage unit based on the acquired arrival direction of the received wave;
acquire a second intensity ratio of a horizontally polarized component of the received wave from the second intensity ratio table stored in the storage unit based on the acquired arrival direction of the received wave; and
calculate the polarization direction of the received wave as a ratio of the horizontally polarized component and a ratio of the vertically polarized component, wherein the ratio of the horizontally polarized component is determined with expression (1) and the ratio of the vertically polarized component is determined with expression (2):

$$PH=(M-TV)/(TH-TV) \quad (1)$$

$$PV=1-PH \quad (2)$$

wherein: PH is the ratio of the horizontally polarized component,
PV is the ratio of the vertically polarized component,
TV is the first intensity ratio,
TH is the second intensity ratio, and
M is the third intensity ratio
wherein the polarization direction measuring program further causes the polarization direction measuring device to calculate polarization direction of the received wave from the predetermined calculation expression based on the intensity ratio of the received wave acquired by the detector, the intensity ratio of the vertically polarized component of the received wave, and the intensity ratio of the horizontally polarized component of the received wave.

13. The polarization direction measuring device according to claim 1, wherein:
the acquiring unit includes a plurality of arrival direction detecting antennas different from the plurality of circularly polarized antennas, and
the acquiring unit is configured to detect the arrival direction of the received wave based on the received wave using the plurality of the arrival direction detecting antennas.

* * * * *